April 19, 1949.  O. C. SARE  2,467,914
PINCH LOCK
Filed Dec. 11, 1944
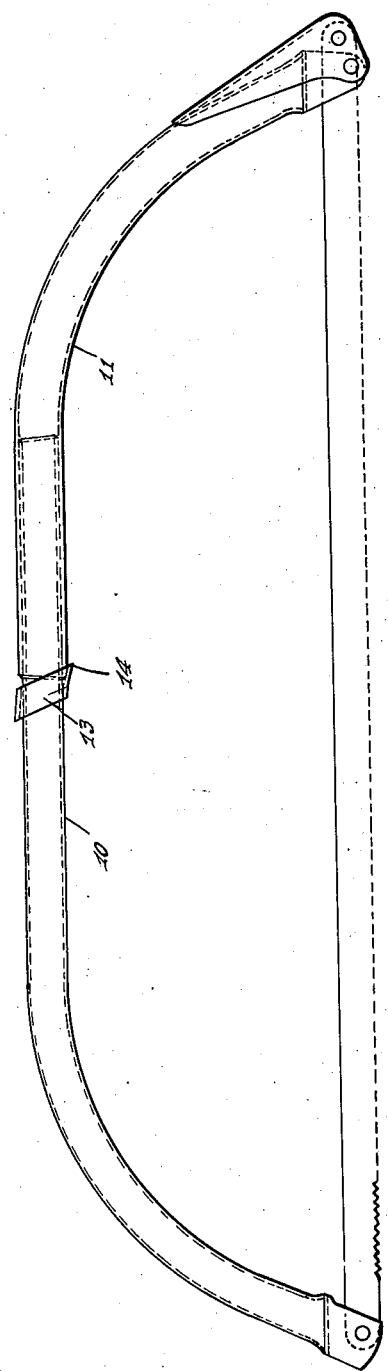
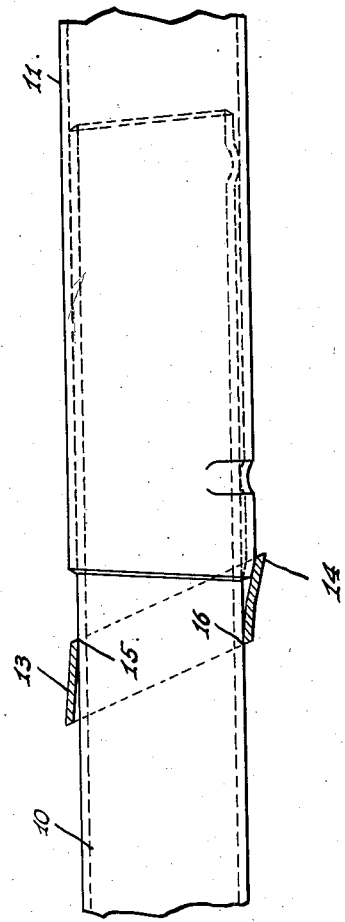
INVENTOR.
OTTO C. SARE,
BY
Hood & Hahn
ATTORNEYS.

Patented Apr. 19, 1949

2,467,914

UNITED STATES PATENT OFFICE 2,467,914

PINCH LOCK

Otto C. Sare, Ravenswood, Ind., assignor to E. C. Atkins and Company, Indianapolis, Ind., a corporation of Indiana Application December 11, 1944, Serial No. 567,708

3 Claims. (Cl. 287—58)

The object of my invention is to provide efficient means for locking together two telescoped members in such manner as to resist relative movement in one direction only.

The accompanying drawings illustrate my invention.

Fig. 1 is a side elevation of my invention embodied in a saw frame; and

Fig. 2 is a vertical section on a larger scale.

In the drawings 10 and 11 indicate two elements of a saw frame of common form, one end of the inner member 10 being telescoped within the adjacent outer member 11.

In order that these two members may be held, in one direction, against relative movement, so that the overall length of the frame may be adjusted to receive saw blades of different lengths, I provide the novel locking collar 13 which is sleeved upon the inner member 10 and provided with a lip 14 engageable by the adjacent end of the outer member 11 and canted so as to bite into member 10 at diametrically opposite points so as to resist further movement of member 11 on member 10.

Collar 13 has internal dimensions such as to provide a loose sliding fit on member 10, and the ends of the collar lie in planes at a substantial angle to the axis of the collar and are so axially spaced as to provide two biting edges 15 and 16 in a plane substantially normal to the axis of the collar, edge 16 being at the end of the collar remote from lip 14.

Lip 14 is formed by outwardly displacing a portion of the wall of the collar on the same side of the collar as edge 16, this displacement at the free end of the lip being sufficient to permit the entry of the adjacent end of the outer member 11 between the lip and member 10.

The two members 10 and 11 having been relatively telescoped to provide a desired overall length, collar 13 is driven along member 10 to cause its lip 14 to override member 11 and is thereby canted on member 10 so as to cause the two diametrically opposite edges 15 and 16 of the collar 13 to bite into member 10 and thus resist further telescoping of the two members 10 and 11.

It will be noted that, the collar being cut on the bias, relative to its axis, the lip 14 may be formed within the overall length of the whole body collar. The collar-engaging end of the member 11 may, therefore, lie square with the axis of the member while being, at the same time, capable of underriding the lip of the collar.

If the two ends of the collar lay in planes substantially normal to the axis of the collar, lip 14 would necessarily have to extend axially beyond the main body of the collar in order to cooperate with a square-end telescoping member. By forming my locking collar in the manner stated, i. e., cut on the bias relative to the collar axis, there is a considerable saving of material as well as a more advantageous relative arrangement of the two biting edges 15 and 16.

I claim as my invention:

1. As an article of manufacture, a pinch collar having its two ends in planes lying at a substantial diagonal angle to the axis of the collar with a portion of the main body at one of the acute angles outwardly displaced.

2. As an article of manufacture, a pinch collar having its two ends in parallel planes lying at a substantial diagonal angle to the axis of the collar with a portion of the main body at one of the acute angles outwardly displaced, the two edges at the obtuse angles lying in a plane substantially normal to the axis of the collar.

3. The combination with two telescoped members, of a pinch collar sleeved on the inner one of said members and comprising a main body having its two ends lying in parallel planes at a substantial angle to the axis of the collar and at one of the acute angles outwardly displaced, the outward displacement at the free edge being sufficient to permit overriding of the adjacent end of the outer telescoped member.

OTTO C. SARE.

REFERENCES CITED

The following references are of record in the file of this patent:

UNITED STATES PATENTS

| Number | Name | Date |
|---|---|---|
| 1,326,623 | Voight | Dec. 30, 1919 |
| 1,845,143 | Friesner | Feb. 16, 1932 |
| 2,051,969 | Shastock | Aug. 25, 1936 |